United States Patent
Wang et al.

(10) Patent No.: US 9,161,165 B2
(45) Date of Patent: *Oct. 13, 2015

(54) OBSCURING TRUE LOCATION FOR LOCATION-BASED SERVICES

(71) Applicant: Google Inc., Mountain View, CA (US)

(72) Inventors: Gang Wang, Frederick, MD (US); Yu Mao, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/555,310

(22) Filed: Nov. 26, 2014

(65) Prior Publication Data
US 2015/0087335 A1 Mar. 26, 2015

Related U.S. Application Data

(63) Continuation of application No. 13/933,971, filed on Jul. 2, 2013, now Pat. No. 8,909,250.

(51) Int. Cl.
*H04W 4/02* (2009.01)
*H04W 64/00* (2009.01)

(52) U.S. Cl.
CPC ............... *H04W 4/02* (2013.01); *H04W 64/00* (2013.01)

(58) Field of Classification Search
CPC ........ H04W 64/00; H04W 4/02; H04W 88/02
See application file for complete search history.

(56) References Cited

U.S. PATENT DOCUMENTS

| | | | |
|---|---|---|---|
| 7,139,820 B1 | 11/2006 | O'Toole et al. | |
| 7,477,905 B2 | 1/2009 | George | |
| 8,040,219 B2 | 10/2011 | Haartsen et al. | |
| 8,547,903 B2 | 10/2013 | Lee et al. | |
| 8,559,949 B2 | 10/2013 | Schmidt et al. | |
| 2005/0250516 A1 | 11/2005 | Shim | |
| 2007/0264974 A1 | 11/2007 | Frank et al. | |
| 2008/0132251 A1* | 6/2008 | Altman et al. | 455/457 |

(Continued)

FOREIGN PATENT DOCUMENTS

KR 10-2013-0038953 4/2013

OTHER PUBLICATIONS

International Search Report/Written Opinion of PCT/US2014/045113, DTD Oct. 22, 2014, 9 pages.
US Notice of Allowance on U.S. Appl. No. 13/933,971 DTD Aug. 15, 2014, 11 pages.

*Primary Examiner* — Ajit Patel
(74) *Attorney, Agent, or Firm* — Foley and Lardner LLP; John D. Lanza

(57) ABSTRACT

A location of a client device may be obscured by using generated random offsets and/or a set of regions. In one implementation, the location of a client device may be obscured using a first random offset and a second random offset. A pseudo-location may be determined based on the location of the client device, the first random offset, and the second random offset. The pseudo-location may be transmitted to a third-party for a location-based service. In another implementation, the location of a client device may be obscured using a first random offset and a set of regions. An intermediate location may be determined based on the location of the client device and the first random offset. A region of the set of regions may be determined based on the intermediate location. A pseudo-location may be transmitted to a third-party for a location-based service based on the determined region.

20 Claims, 8 Drawing Sheets

(56) References Cited

U.S. PATENT DOCUMENTS

| | | |
|---|---|---|
| 2008/0133336 A1 | 6/2008 | Altman et al. |
| 2008/0171559 A1 | 7/2008 | Frank et al. |
| 2012/0105474 A1* | 5/2012 | Cudalbu et al. ............... 345/633 |
| 2012/0191614 A1 | 7/2012 | Babitch et al. |
| 2012/0220314 A1 | 8/2012 | Altman et al. |
| 2013/0053071 A1 | 2/2013 | Jones et al. |
| 2014/0005939 A1* | 1/2014 | Schatzberg et al. ........... 701/517 |
| 2014/0323152 A1* | 10/2014 | Zhang et al. ............... 455/456.1 |

* cited by examiner

OBSCURING TRUE LOCATION FOR LOCATION-BASED SERVICES

CROSS-REFERENCE TO RELATED PATENT APPLICATIONS

This application is a Continuation of U.S. application Ser. No. 13/933,971, filed Jul. 2, 2013, incorporated herein by reference in its entirety.

BACKGROUND

Location-based services are increasingly being offered to provide services to users based upon a location of the user. For example, location-based services may be offered for users having mobile devices. Examples of such location-based services may include indicating a location of a mobile device of a user to other users associated with the user of the mobile device (such as via a social media website or application), indicating businesses nearby the mobile device's location as part of a results page in response to a search query, or delivering third-party content items or coupons based on a location of the mobile device.

SUMMARY

One implementation relates to a method for obscuring a true location of a client device. The method may include generating a first random two dimensional offset and a second random two dimensional offset. The method may further include receiving a location of the client device. A pseudo-location for the client device may be determined based on the received location, the first random two dimensional offset, and the second random two dimensional offset. The pseudo-location may be transmitted for a location-based service.

Another implementation relates to a system for obscuring a true location of a client device. The system may include a processing module and a storage device storing instructions that, when executed by the processing module, cause the processing module to perform several operations. The operations may include receiving a location of a client device. A first random two dimensional offset vector and a second random two dimensional offset vector may be generated. A pseudo-location may be determined based on the received location, the first random two dimensional offset vector, and the second random two dimensional offset vector. The pseudo-location may be transmitted to a third-party for a location-based service.

Yet a further implementation relates to a system for obscuring a true location of a client device. The system may include a processing module and a storage device storing instructions that, when executed by the processing module, cause the processing module to perform several operations. The operations may include receiving a set of regions and a location of a client device. A first random two dimensional offset may be generated and an intermediate location may be determined based on the received location and the first random two dimensional offset. A region within the set of regions may be determined based on the intermediate location. The determination of the region may include determining that the intermediate location is within the determined region. A pseudo-location may be transmitted to a third-party for a location-based service based on the determined region.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
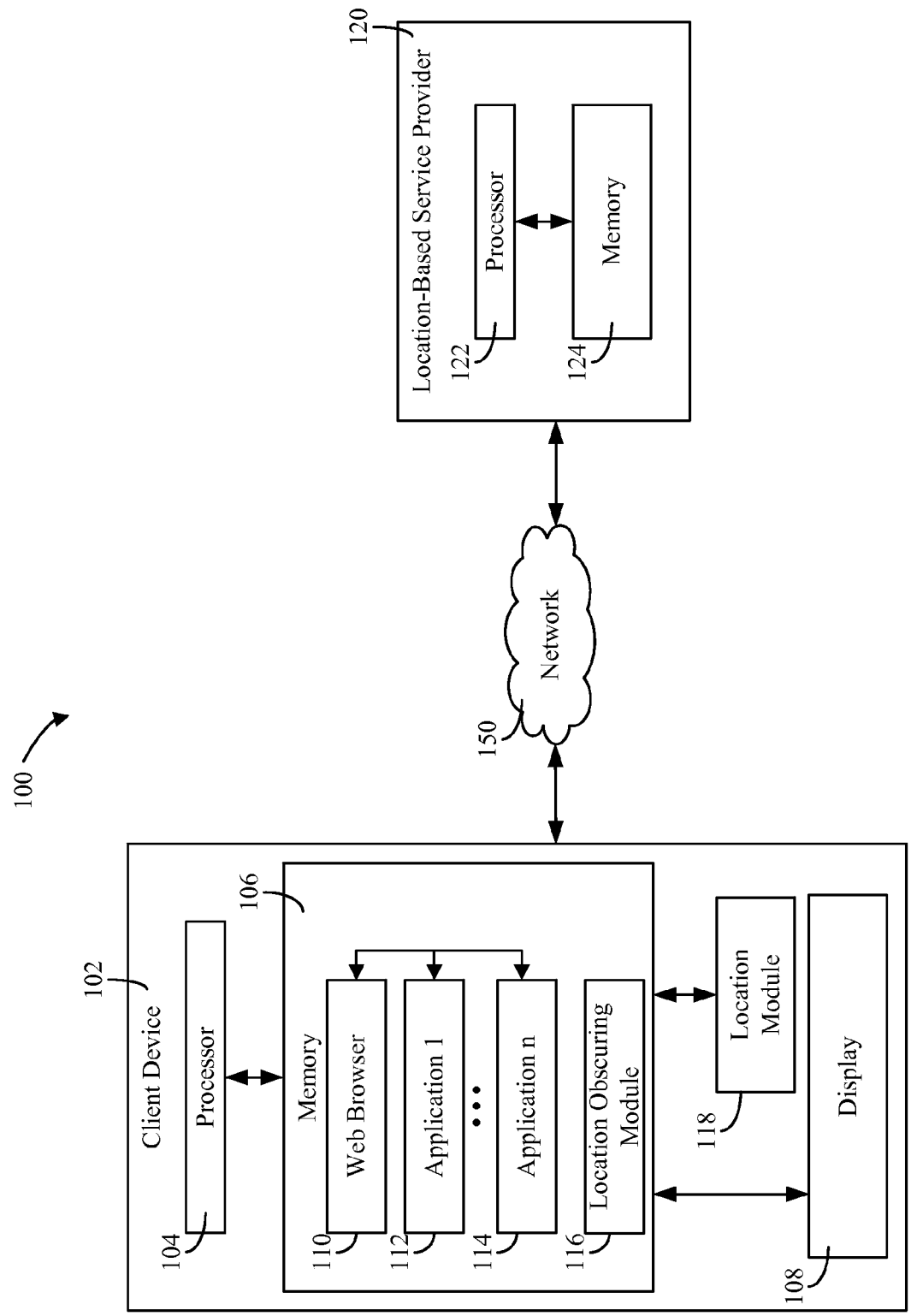
FIG. 1 is a block diagram depicting an example system for providing location-based services to a client device.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways, as the described concepts are not limited to any particular manner of implementation. Examples of specific implementations and applications are provided primarily for illustrative purposes.

In some instances, location-based services may be offered for users of client devices. For example, such location-based services may include indicating a location of a client device of a user to other users associated with the user of the client device (such as via a social media website or application), indicating businesses nearby the client device's location as part of a results page in response to a search query, or delivering third-party content items or coupons based on a location of the client device. Such location-based services may require the precise location of the client device to be transmitted to a system of a third-party, such as a location-based service provider, over a network, such as the Internet, in order to make such services available.

The precise location of the client device may be determined using GPS, which is available for most mobile client devices (e.g., smartphones, tablets, etc). In other instances, the precise location of the client device may be determined using WiFi access point locations. For example, if a client device connects to the Internet through a stationary WiFi access point and the precise location of the stationary WiFi access point is known, then the location of the client device may be determined to within approximately one hundred feet. In addition, the location of the client device may be inferred based on location history. For example, if the precise location of the client device was recently known, such as being previously determined by GPS or connecting to a known WiFi access point, then the client device is likely still near the vicinity of the prior location. The precise location of the client device may be used for one or more of the foregoing location-based services to be provided to the client device.

However, a user of a client device providing such precise location data may have little or no control over such data once the data is transmitted to the system of the third-party (e.g., who will be able to access the location information, for what purpose, etc.). In addition, such precise location data may be intercepted en route to the system of the third-party by others who may use the precise location data in a manner the user would not prefer. Such concern over providing precise location data may result in fewer users of client devices to utilize location-based services of location-based service providers.

Accordingly, it may be useful to obscure the precise location of a client device in a secure manner such that the precise location cannot be determined, but still permitting location-based services to be provided. The area within which the obscured pseudo-location may be determined relative to the precise location of the client device may be based on one or more factors. For example, the area within which the obscured pseudo-location may be located may sized such that it is no smaller than a predetermined size (e.g., one square kilometer or other size) based on preferences, standards, guidelines, local customs, local laws, etc. In other instances, the area within which the obscured pseudo-location may be located may be sized such that a predetermined number of client devices pass through the area within a given period of time (e.g., at least 1,000 client devices per month) based on preferences, standards, guidelines, local customs, local laws, etc. The area within which the obscured pseudo-location may be located may also be sized such that location-based services may still be effectively offered (i.e., the area within which the obscured pseudo-location may be located is not so large as to render the location-based services ineffective or inapplicable). For example, in the instance of a third-party content item associated with a gas station offering low gas prices, an obscured pseudo-location that is within two miles of the precise location of the client device may be as effective as the precise location of the client device. However, an obscured pseudo-location that is within 100 miles may be ineffective or inapplicable.

While the foregoing considerations are useful relative to the area within which the obscured pseudo-location may be located, the manner in which the obscured pseudo-location is provided may also impact whether the obscured pseudo-location is done in a secure manner. In one implementation, the client device may obtain a precise location for the client device using a location module (e.g., GPS module, Wifi Access Point Location module, etc.). The client device may calculate the sum of the precise location and an offset value to determine a pseudo-location for the client device. In some instances, the offset value may be limited such that the area within which the obscured pseudo-location is located meets one or more of the foregoing area considerations. The pseudo-location may be used by the client device for a location-based service. While the foregoing may provide a suitable pseudo-location in many instances, in some instances the offset value may be determined by third-parties.

For example, if the offset value is constant or constant over a period of time, then the offset value may be determined based on two or more pseudo-locations. That is, if a first precise location $P_1$ is transmitted to a first third-party at a first time $t_1$ for a location-based service (e.g., a navigation application, a social media application, a location application, etc.) and a first pseudo-location $SP_1$, where $$SP_1 = P_2 + \text{Offset}$$

is transmitted to a second third-party for another location-based service at a second time $t_2$, where the first precise location $P_1$ and the second precise location $P_2$ are relatively close to each other such that $|P_1-P_2|$ is minimized (e.g., within and area of approximately 10,000 square feet or approximately 1000 square meters), then the Offset may be determined by $$\text{Offset} = SP_1 - P_1$$

where $P_1 \approx P_2$. If the Offset remains constant and a second pseudo-location $SP_2$ is generated, where $$SP_2 = P_3 + \text{Offset}$$

for another location-based service, then the later precise location $P_3$ may be determined even if $P_3$ is not near the first or second precise locations $P_1$ or $P_2$.

Moreover, even if a random offset value is used, if the randomly generated value for the offset has a zero-mean and the client device remains relatively stationary (e.g., within and area of approximately 10,000 square feet or approximately 1000 square meters), then the precise location of the client device may be determined. For example, if the precise location $P_x$ of the client device remains relatively stationary over a period of time and a number of pseudo-locations are generated for location-based services, e.g., $$SP_i = P_x + \text{Offset}_i$$

and $i=1 \ldots N$, then the precise location $P_x$ may be determined by $$P_x = \frac{\sum_{i=1}^{N} SP_i}{N} - \frac{\sum_{i=1}^{N} O_i}{N}$$

Where $$\frac{\sum_{i=1}^{N} O_i}{N} \to 0$$

for a sufficiently large N, such that $$P_x = \frac{\sum_{i=1}^{N} SP_i}{N}.$$

Accordingly, it may be useful to implement additional factors to further secure the obscured pseudo-location from being determined by third-parties. In one example implementation, the obscured pseudo-location may be generated based on the precise location and a pair of randomly generated offsets may be utilized. The first randomly generated offset may be generated periodically (e.g., hourly, daily, weekly, monthly, etc.) and the second randomly generated offset may be generated each time the client device requests a location-based service. Accordingly, the obscured pseudo-location may be further secured from being determined by third-parties. In another example implementation, the obscured pseudo-location may be used to determine region of a set of regions within which the obscured pseudo-location is located. A center or other point of the determined region may then be used as the pseudo-location for the client device, thereby further obscuring the true location of the client device. Specific implementations of generating such obscured pseudo-locations and uses thereof will be discussed in greater detail below.

FIG. 1 depicts an example environment 100 having a client device 102 and a location-based service provider 120. The client device 102 may transmit and receive data from the location-based service provider 120 via a network 150. The network 150 may be any form of computer network that relays information between the client device 102 and the location-based service provider 120. For example, the network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, smartphones, tablets, mobile phones, etc.) that are configured to receive and/or transmit data within the network 150. The network 150 may further include any number of hardwired and/or wireless connections. For example, the client device 102 may communicate wirelessly (e.g., via WiFi, cellular, radio, etc.) with a transceiver that is hardwired (e.g., via a fiber optic cable, a CAT5 cable, etc.) to other computing devices in the network 150.

The client device 102 may be any number of different types of user electronic devices configured to communicate via the network 150 (e.g., a laptop computer, a desktop computer, a tablet computer, a smartphone, a digital video recorder, a set-top box for a television, a video game console, combinations thereof, etc.). The client device 102 is shown to include a processor 104 and a memory 106. The memory 106 may store machine instructions that, when executed by the processor 104, cause the processor 104 to perform one or more of the operations described herein. The processor 104 may include one or more microprocessors, application specific integrated circuits (ASICs), field programmable gate arrays (FPGAs), other forms of processing circuits, or combinations thereof. The memory 106 may include, but is not limited to, electronic, optical, magnetic, or any other storage or transmission device capable of providing the processor 104 with program instructions. The memory 106 may include storage devices such as a floppy disk, CD-ROM, DVD, magnetic disk, memory chip, ROM, RAM, EEPROM, EPROM, flash memory, optical media, or any other suitable memory from which the processor 104 can read instructions. The processor 104 and the memory 106 may form a processing module.

The client device 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of the client device 102 (e.g., a built-in display, microphone, etc.) or external to the housing of the client device 102 (e.g., a monitor connected to the client device 102, a speaker connected to the client device 102, etc.), according to various implementations. For example, the client device 102 may include an electronic display 108, which may display webpages, user interfaces for applications, and/or and other displays. In various implementations, the display 108 may be located inside or outside of the same housing as that of the processor 104 and/or the memory 106. For example, the display 108 may be an external display, such as a computer monitor, television set, or any other stand-alone form of electronic display. In other examples, the display 108 may be integrated into the housing of a laptop computer, mobile device, smartphone, tablet, or other form of computing device having an integrated display.

The client device 102 of the present example further includes a location module 118. The location module 118 may include a GPS device to determine a location of the client device 102 via GPS data. In other implementations, the location module 118 may include a WiFi transceiver configured to wirelessly connect to a WiFi access point. The location module 118 may utilize the name, MAC address, and/or other data from the WiFi access point to determine a location of the client device 102. In still other implementations, the location module 118 may receive data corresponding to signal strength from one or more cellular towers such that the location module 118 may determine a location of the client device 102. Still other location modules 118 that are configured to determine a location of the client device 102 may be used.

In the present example, the client device 102 may store, via the memory 106, and execute, via the processor 104, a web browser 110 and/or one or more applications 112, 114, which may use a location-based service of a location-based service provider 120. As shown, the client device 102 may include a web browser 110 which is configured to retrieve and display webpages available from content sources, which may be location-based service providers 120, via the network 150 (e.g., a search result webpage of an online search engine, a visited webpage, etc.). The web browser 110 may access a first-party webpage and provide the webpage for presentation on the display 116 of the client device 102. The retrieval and display of webpages may use a location-based service of the location-based service provider 120. For example, a search engine accessed via the web browser 110 may include a location-based service to provide a listing or indication of nearby businesses associated with a search query entered into a search field of the search engine. When the user of the client device 102 enters a search query into a search field of the search engine, a location of the client device 102 may be provided by the client device 102 or requested by the provider of the search engine. The search engine provider, which may be a location-based service provider 120, may utilize the location of the client device 102 to generate and present a list or other indication of nearby businesses associated with the search query with a search results page.

In other implementations, a retrieved first-party webpage may be presented with a third-party content item that is selected based, at least in part, on a location of the client device 102. For example, the retrieved webpage may include a content tag that causes the web browser 110 to send a content selection request to a content selection service, which may be a location-based service provider 120 or may be associated with a location-based service provider 120. The content selection request may request, for example, third-party content to be selected and served for presentation in conjunction with the first-party webpage (e.g., as content embedded in the webpage, in a popup window, etc.). In some cases, content selection request includes a device identifier for the client device 102, such as a cookie set by content selection service 104, described below. In addition, a location of the client device 102 may be included with the content selection request. The location of the client device 102 may be provided to a location-based service provider 120 to select and serve third-party content based, at least in part, on the location of the client device 102. For example, the location-based service provider 120 may directly select and serve a third-party content item using the provided location data and/or may permit third parties to submit real-time bids for third-party content items to be selected and served based on a location of the client device 102. Other information that may be included in content selection request may include a topic of the webpage being accessed by the web browser 110, the address of the webpage being accessed, or other such information. Still other location-based services from location-based service providers 120 may be implemented via web browser 110 when executed on the client device 102.

The client device 102 may also include non-browser applications 112, 114 (e.g., a first application 112 through nth application 114). In general, the applications 112, 114 differ from web browser 110 in that web browser 110 is configured to retrieve webpages in response to a URL specified by the user of the client device 102 In some implementations, the applications 112, 114 may be configured to only retrieve specific webpages, access predefined online services (e.g., the accessed services may be included in the code of the applications 112, 114), launch the web browser 110 to retrieve a webpage, or not use any webpage data at all. For example, the applications 112, 114 may be communications applications (e.g., email applications, instant messenger applications, etc.), productivity applications (e.g., text editors, software development applications, spreadsheet applications, etc.), social media applications, multimedia players (e.g., music players, movie players, etc.), games, navigation applications, or any other form of application. In some implementations, the applications, 112, 114 may directly access and use a location-based service provided by a location-based service provider 120, such as a social media application with a location feature for "checking in." In other implementations, the applications 112, 114 may present third-party content items that are selected based, at least in part, on a location of the client device 102 (e.g., similar to the selection and serving of third-party content items to be presented in conjunction with first-party webpages). Accordingly, the applications 112, 114 may indirectly utilize a location-based service of a location-based service provider 120.

In addition to the storing and execution of the web browser 110 and the applications 112, 114, the memory 106 may also store and execute a location obscuring module 116. The location obscuring module 116 receives true location data from the location module 118 and outputs a pseudo-location to be used in lieu of a true location for a location-based service provided by a location-based service provider 120. The location obscuring module 116 may include a random number generator used to generate random offset values such that the location obscuring module 116 may generate a pseudo-location for the client device 102 based on the true location from the location module 118 and the random offset values. The operation of the location obscuring module 116 will be discussed in greater detail below in reference to FIG. 2.

In some instances, the client device 102 may identify itself to the location-based service provider 120 or a content selection service through the use of one or more device identifiers. Device identifiers may include, but are not limited to, cookies, universal device identifiers (UDIDs), device serial numbers, telephone numbers, or network addresses. For example, the location-based service provider 120 may set a cookie on the client device 102 when the client device 102 visits a particular webpage or uses a particular application that accesses the location-based service provider 120. On subsequent webpage visits or executions of the application, the cookie may be sent by the client device 102 to the location-based service provider 120, allowing the location-based service provider 120 to attribute the different webpage visits or application executions to the same client device 102.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The location-based service provider 120 may be one or more electronic devices connected to the network 150 that provides a location-based service or other content to devices connected to the network 150. For example, the location-based service provider 120 may be a computer server (e.g., a FTP server, a file sharing server, a web server, etc.) or combination of servers (e.g., data centers, cloud computing platforms, etc.). The location-based service may be a part of an application that provides a location-based service, a part of a website that provides a location-based service, a search engine that provides a location-based service, a service to deliver third-party content items based on a location of the client device 102, and/or other location-based services. In some implementations, the location-based service may include or be associated with one or more content items, such as webpage data, a text file, a spreadsheet, images, search results, and other forms of content items. Similar to the client device 102, the location-based service provider 120 may include a processor 122 and a memory 124 that store program instructions executable by the processor 122 to provide the location-based service or other otherwise transmit data to the client device 102 via the network 150. For example, the memory 124 of the location-based service provider 120 may include instructions to execute software, such as web server software, FTP serving software, or other types of software, that cause the location-based service provider 120 to provide the location-based service and/or other content via the network 150 to the client device 102. The processor 122 and the memory 124 may form a processing module.

The location-based service provider 120 provides a location based service, either directly or indirectly, to the client device 102. In some implementations, the location-based service provider 120 may directly provide the location-based service (e.g., a social media webpage or backend of a social media application that provides users with a location-based service to "check in" at locations or associates a location with a post by a user of the client device 102). In other implementations, the location-based service provider 120 may be utilized in conjunction with a content source to provide a location-based service in conjunction with content from a content source (e.g., the location-based service provider 120 may select and serve a third-party content item or may permit third parties to submit real-time bids for third-party content items to be selected and served based on a location of the client device 102 and to be presented with a first-party content webpage provided by the content source).

Figure 2:
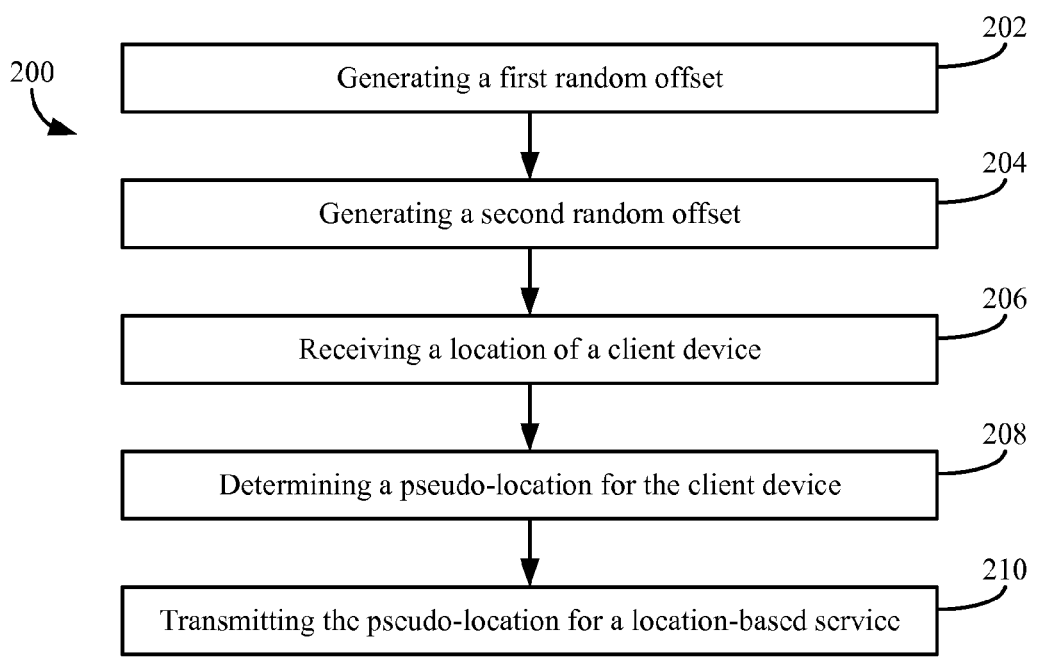
FIG. 2 is a flow diagram depicting an example method for obscuring a true location of a client device that may be implemented by the client device of FIG. 1.

Referring to FIG. 2, a method 200 for obscuring a true location of a client device 102 for a location-based service can be implemented by the location obscuring module 116 of the client device 102. The method 200 may begin when a request for a location is received by the client device 102 (such as from a location-based service provider 120) or the client device 102 is to transmit a location (such as when executing a local application). The method 200 includes generating a first random offset (block 202). The first random offset may be generated by a random number generator of the location obscuring module 116 of the client device 102. The first random offset may be a two dimensional vector having values corresponding to a randomly generated offset value for an x-axis and a randomly generated offset value for a y-axis.

In some implementations, the location obscuring module 116 may compare the norm of the two dimensional vector for the first random offset (i.e., the resulting offset distance based on the offsets values for the longitude and longitude axes) to one or more predetermined values to determine if the resulting offset distance is above or below the one or more predetermined values. In an example implementation, the one or more predetermined values may be values representative of approximately 0 miles, inclusive, and approximately 2.523 miles, inclusive. The two dimensional vector having randomly generated values may be representative of an offset circle having a radius of approximately 2.523 miles and defining an area of approximately 20 square miles within which the first randomly generated offset is located. Of course other predetermined values may be used, such as values representative of approximately 0 miles, inclusive, and approximately 1 mile, inclusive (3.14 square mile area circle), values representative of approximately 0 miles, inclusive, and approximately 2 miles, inclusive (12.56 square mile area circle), etc. In some implementations, the predetermined values may be determined based on a user's preferences, local standards, local guidelines, local customs, local laws, etc.

In other implementations, the location obscuring module 116 may compare the absolute value of each randomly generated value of the two dimensional vector for the first random offset to one or more predetermined values to determine if each randomly generated offset value is above or below the one or more predetermined values. For example, the one or more predetermined values may be values representative of approximately 0 miles, inclusive, and approximately 2.236 miles, inclusive. Accordingly, the two dimensional vector having randomly generated values may be representative of an offset square defining an area of approximately 20 square miles within which the first randomly generated offset is located. Of course other predetermined values may be used, such as values representative of approximately 0 miles, inclusive, and approximately 1 mile, inclusive (4 square mile square area), values representative of approximately 0 miles, inclusive, and approximately 2 miles, inclusive (16 square mile square area), etc. In some implementations, the predetermined values may be determined based on a user's preferences, local standards, local guidelines, local customs, local laws, etc.

The first random offset may be generated on a periodic basis, such as hourly, daily, weekly, monthly, etc. and stored in a computer-readable medium, such as memory 106. The periodicity for generating the first random offset may be determined such that the movement of the client device 102 over the period is significant compared to a minimum pre-defined distance. For example, the periodic regeneration of the first random offset may be determined such that the client device 102 is likely to move more than a predetermined distance (e.g., one square kilometer or other distance), which may be based on a user's preferences, local standards, local guidelines, local customs, local laws, etc. In one example implementation, the first random offset may be regenerated on a daily basis.

In other implementations, the two dimensional vector for the first random offset may have a first randomly generated value corresponding to a radius and a second randomly generated value corresponding to an angle.

The method 200 also includes generating a second random offset (block 204). The second random offset may also be generated by the random number generator of the location obscuring module 116 of the client device 102. The second random offset may also be a two dimensional vector having values corresponding to a randomly generated offset value for an x-axis and a randomly generated offset value for a y-axis.

In some implementations, the location obscuring module 116 may compare the norm of the two dimensional vector for the second random offset (i.e., the resulting offset distance based on the offsets values for the longitude and latitude axes) to one or more predetermined values to determine if the resulting offset distance is above or below the one or more predetermined values. In an example implementation, the one or more predetermined values may be values representative of approximately 0 miles, inclusive, and approximately 2.523 miles, inclusive. The two dimensional vector having randomly generated values may be representative of an offset circle having a radius of approximately 2.523 miles and defining an area of approximately 20 square miles within which the first randomly generated offset is located. Of course other predetermined values may be used, such as values representative of approximately 0 miles, inclusive, and approximately 1 mile, inclusive (3.14 square mile area circle), values representative of approximately 0 miles, inclusive, and approximately 2 miles, inclusive (12.56 square mile area circle), etc. In some implementations, the predetermined values may be determined based on a user's preferences, local standards, local guidelines, local customs, local laws, etc.

In other implementations, the location obscuring module 116 may compare the absolute value of each randomly generated value of the two dimensional vector for the second random offset to one or more predetermined values to determine if each randomly generated offset value is above or below the one or more predetermined values. For example, the one or more predetermined values may be values representative of approximately 0 miles, inclusive, and approximately 2.236 miles, inclusive. Accordingly, the two dimensional vector having randomly generated values may be representative of an offset square defining an area of approximately 20 square miles within which the first randomly generated offset is located. Of course other predetermined values may be used, such as values representative of approximately 0 miles, inclusive, and approximately 1 mile, inclusive (4 square mile square area), values representative of approximately 0 miles, inclusive, and approximately 2 miles, inclusive (16 square mile square area), etc. In some implementations, the predetermined values may be determined based on a user's preferences, local standards, local guidelines, local customs, local laws, etc.

The second random offset may be generated for each request to be sent to a third-party for a location-based service. For example, when new location data is to be transmitted from the client device 102 to a location-based service provider 120, the location obscuring module 116 generates a new second random offset.

In other implementations, the two dimensional vector for the second random offset may have a first randomly generated value corresponding to a radius and a second randomly generated value corresponding to an angle.

The method 200 further includes receiving a location of the client device 102 (block 206). In an example implementation, the location obscuring module 116 receives location data from the location module 118. The location data from the location module 118 may include values representative of longitude and latitude coordinates generated by a GPS module, determined from a WiFi access point, determined by cellular triangulation, etc.

The location obscuring module 116 may determine, using the processor 104 of the client device 102, a pseudo-location using the location data from the location module 118, the generated first random offset, and the generated second random offset (block 208). In one example, the pseudo-location may be determined by the equation $$SP = P + Offset_1 + Offset_2$$

where SP is the pseudo-location, P is the location data received from the location module 118, $Offset_1$ is the first random offset, and $Offset_2$ is the second random offset.

The determined pseudo-location may be transmitted for a location-based service provided by a location-based service provider 120 (block 210). The data for the pseudo-location may be transmitted by itself or may be included with other data (e.g., with a content item request). In some implementations, the location-based service may be associated with a third-party content item, such as part of the selecting and serving of third-party content items based on the pseudo-location transmitted by the client device 102. In other implementations, the location-based service may be associated with a search, such as by presenting a list or other indication of nearby businesses that are relevant to an entered search query and based on the pseudo-location transmitted by the client device 102. In yet further implementations, the location-based service may be associated with a social media application, such as associating a location with a post based on the pseudo-location transmitted by the client device 102 or associating a location for "checking in" based on the pseudo-location transmitted by the client device 102.

In one example implementation, the client device 102 may execute a social media application. If a user of the client device 102 chooses to obscure the location of the client device 102 when using the social media application, the true location of the client device 102 may be determined by the location module 118. The true location data may be used by the location obscuring module 116 to determine a pseudo-location for the client device 102. The pseudo-location may then be output to the location-based service provider 120 for a desired location-based service (e.g., when creating a post using the social media application that includes a location of the client device 102, then the pseudo-location may be output by the client device 102 instead of the true location to the location-based service provider 120). Accordingly, the true location of the client device 102 may remain obscured from the location-based service provider 120 and/or any third-parties that may intercept the pseudo-location output by the client device 102.

Figure 3:
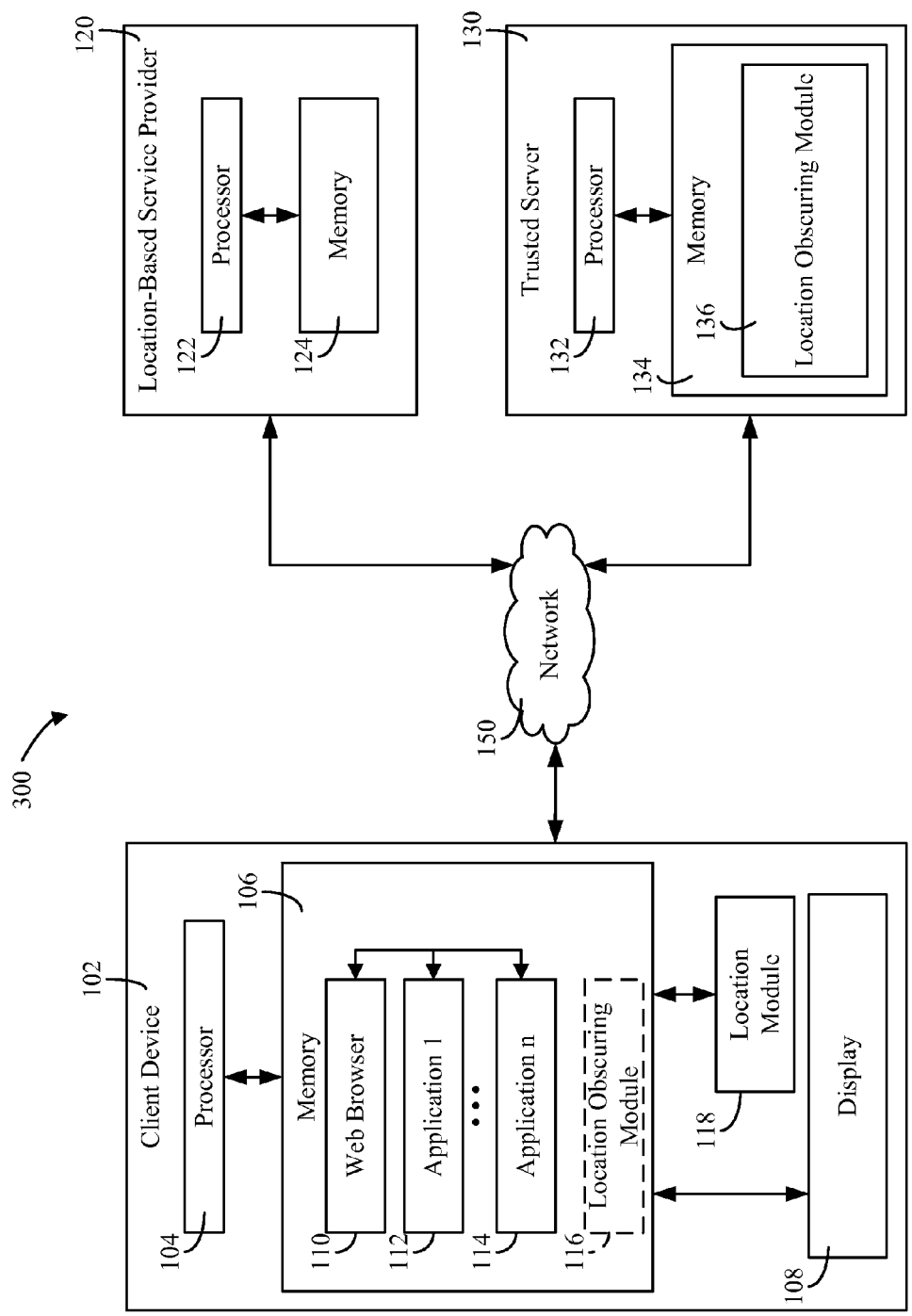
FIG. 3 is another block diagram depicting another example system for providing location-based services to a client device.

While the foregoing describes an implementation for obscuring the location of a client device 102 using a location obscuring module 116 of the client device 102, a trusted server 130 may be used to obscure the location of a client device 102 in some implementations. FIG. 3 depicts an environment 300 having a client device 102, a location-based service provider 120, and a trusted server 130 in communication via a network 150. In the present example, the network 150 and the location service provider 120 may be substantially the same as described in reference to FIG. 1. In the present example, the client device 102 may optionally omit the location obscuring module 116 or may include the location obscuring module 116 to generate one or more random offsets, as will be further discussed below in reference to FIGS. 5 and 7.

The trusted server 130 may be a computer server or combination of servers (e.g., data centers, cloud computing platforms, etc.). The trusted server 130 is shown to include a processor 132 and a memory 134. The memory 134 may store machine instructions that, when executed by the processor 132, cause the processor 132 to perform one or more of the operations described herein. The processor 132 may include one or more microprocessors, application specific integrated circuits (ASICs), field programmable gate arrays (FPGAs), other forms of processing circuits, or combinations thereof. The memory 134 may include, but is not limited to, electronic, optical, magnetic, or any other storage or transmission device capable of providing the processor 132 with program instructions. The memory 134 may include a floppy disk, CD-ROM, DVD, magnetic disk, memory chip, ROM, RAM, EEPROM, EPROM, flash memory, optical media, or any other suitable memory from which the processor 104 can read instructions. The processor 132 and the memory 134 may form a processing module.

In the present example, the memory 134 may include a location obscuring module 136. The location obscuring module 136 receives location data from the client device 102 and outputs a pseudo-location to be used in lieu of a true location for a location-based service provided by a location-based service provider 120. In some implementations, the location data from the client device may the true location data from the location module 118 of the client device 102 or the location data may be a pseudo-location, and intermediate pseudo-location, and/or otherwise obscured location data transmitted to the trusted server 130 by the client device 102. The location obscuring module 136 may include a random number generator used to generate random offset values such that the location obscuring module 136 may determine a pseudo-location based on the location data received from the client device 102 and the random offset values. The determined pseudo-location may then be transmitted to the location-based service provider 120 via the network 150 or directly by the trusted server 130. Thus, the trusted server 130 may be an intermediary between the client device 102 and the location-based service provider 120.

Figure 4:
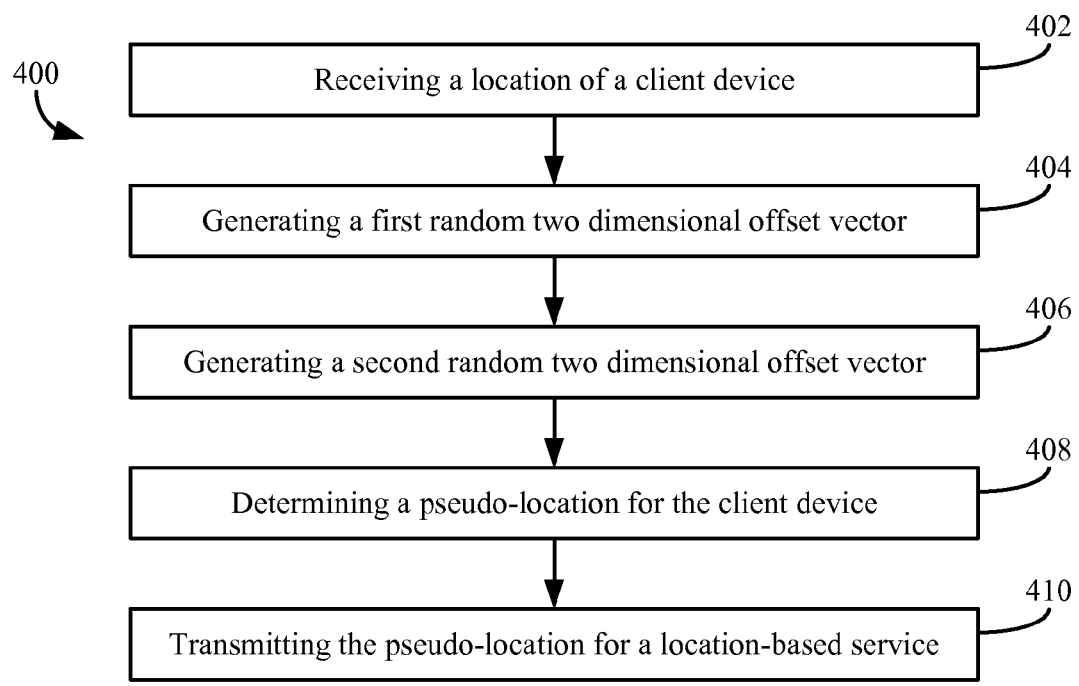
FIG. 4 is another flow diagram depicting another example method for obscuring a true location of a client device that may be implemented by the trusted server of FIG. 3.

Referring to FIG. 4, an example method 400 that may be implemented by the location obscuring module 136 of the trusted server 130 may begin by receiving data indicative of a location of the client device 102 (block 402). In some implementations, the data indicative of the location of the client device 102 may include a two dimensional vector of longitude and latitude coordinates corresponding to the location of the client device 102 as determined by the location module 118 of the client device 102. In other implementations, the data indicative of the location of the client device 102 may be an encoded string of data that may be decoded and parsed into data representative of the location of the client device 102.

The method 400 includes generating a first random two dimensional offset vector (block 404). The first random two dimensional offset vector may be generated by a random number generator of the location obscuring module 136 of the trusted server 130. The first random two dimensional offset vector may have values corresponding to a randomly generated offset value for an x-axis and a randomly generated offset value for a y-axis.

In some implementations, the location obscuring module 136 may compare the norm of the first random two dimensional offset vector (i.e., the resulting offset distance based on the offsets values for the longitude and latitude axes) to one or more predetermined values to determine if the resulting offset distance is above or below the one or more predetermined values. In an example implementation, the one or more predetermined values may be values representative of approximately 0 miles, inclusive, and approximately 2.523 miles, inclusive. The two dimensional vector having randomly generated values may be representative of an offset circle having a radius of approximately 2.523 miles and defining an area of approximately 20 square miles within which the first randomly generated offset is located. Of course other predetermined values may be used, such as values representative of approximately 0 miles, inclusive, and approximately 1 mile, inclusive (3.14 square mile area circle), values representative of approximately 0 miles, inclusive, and approximately 2 miles, inclusive (12.56 square mile area circle), etc. In some implementations, the predetermined values may be determined based on a user's preferences, local standards, local guidelines, local customs, local laws, etc.

In other implementations, the location obscuring module 136 may compare the absolute value of each randomly generated value of the first random two dimensional offset vector to one or more predetermined values to determine if each randomly generated offset value is above or below the one or more predetermined values. For example, the one or more predetermined values may be values representative of approximately 0 miles, inclusive, and approximately 2.236 miles, inclusive. Accordingly, the two dimensional vector having randomly generated values may be representative of an offset square defining an area of approximately 20 square miles within which the first randomly generated offset is located. Of course other predetermined values may be used, such as values representative of approximately 0 miles, inclusive, and approximately 1 mile, inclusive (4 square mile square area), values representative of approximately 0 miles, inclusive, and approximately 2 miles, inclusive (16 square mile square area), etc. In some implementations, the predetermined values may be determined based on a user's preferences, local standards, local guidelines, local customs, local laws, etc.

The first random two dimensional offset vector may be generated on a periodic basis for each device, such as hourly, daily, weekly, monthly, etc. and stored in a computer-readable medium, such as memory 136 and associated with a device identifier of the client device 102 (e.g., as a vector with the device identifier, and the two randomly generated values for the first random two dimensional offset vector). The periodicity for generating the first random two dimensional offset vector may be determined such that offset relative to the movement of the client device 102 over the period is significant compared to a minimum predefined distance. For example, the periodic regeneration of the first random two dimensional offset vector may be determined such that the client device 102 is likely to move more than a predetermined distance (e.g., one square kilometer or other distance), which may be based on a user's preferences, local standards, local guidelines, local customs, local laws, etc. In one example implementation, the first random two dimensional offset vector may be regenerated on a daily basis.

In other implementations, the first random two dimensional offset vector may have a first randomly generated value corresponding to a radius and a second randomly generated value corresponding to an angle.

The method 400 also includes generating a second random two dimensional offset vector (block 406). The second random two dimensional offset vector may also be generated by the random number generator of the location obscuring module 136 of the trusted server 130. The second random two dimensional offset vector may have values corresponding to a randomly generated offset value for an x-axis and a randomly generated offset value for a y-axis.

In some implementations, the location obscuring module 136 may compare the norm of the second random two dimensional offset vector (i.e., the resulting offset distance based on the offsets values for the longitude and latitude axes) to one or more predetermined values to determine if the resulting offset distance is above or below the one or more predetermined values. In an example implementation, the one or more predetermined values may be values representative of approximately 0 miles, inclusive, and approximately 2.523 miles, inclusive. The two dimensional vector having randomly generated values may be representative of an offset circle having a radius of approximately 2.523 miles and defining an area of approximately 20 square miles within which the first randomly generated offset is located. Of course other predetermined values may be used, such as values representative of approximately 0 miles, inclusive, and approximately 1 mile, inclusive (3.14 square mile area circle), values representative of approximately 0 miles, inclusive, and approximately 2 miles, inclusive (12.56 square mile area circle), etc. In some implementations, the predetermined values may be determined based on a user's preferences, local standards, local guidelines, local customs, local laws, etc.

In other implementations, the location obscuring module 136 may compare the absolute value of each randomly generated value of the second random two dimensional offset vector to one or more predetermined values to determine if each randomly generated offset value is above or below the one or more predetermined values. For example, the one or more predetermined values may be values representative of approximately 0 miles, inclusive, and approximately 2.236 miles, inclusive. Accordingly, the two dimensional vector having randomly generated values may be representative of an offset square defining an area of approximately 20 square miles within which the first randomly generated offset is located. Of course other predetermined values may be used, such as values representative of approximately 0 miles, inclusive, and approximately 1 mile, inclusive (4 square mile square area), values representative of approximately 0 miles, inclusive, and approximately 2 miles, inclusive (16 square mile square area), etc. In some implementations, the predetermined values may be determined based on a user's preferences, local standards, local guidelines, local customs, local laws, etc.

The second random two dimensional offset vector may be generated for each request to be sent to a third-party for a location-based service. For example, when new location data is to be transmitted from the client device 102 to a location-based service provider 120, the client device 102 may transmit the new location data to the trusted server 130. The location obscuring module 136 of the trusted server 130 generates a new second random two dimensional offset vector to be used when generating a new pseudo-location to be transmitted to the location-based service provider 120.

In other implementations, the second random two dimensional offset vector may have first randomly generated value corresponding to a radius and a second randomly generated value corresponding to an angle.

The location obscuring module 136 may determine a pseudo-location using the location data from the client device 102, the generated first random two dimensional offset vector, and the generated second random two dimensional offset vector (block 408). In one example, the pseudo-location may be determined by the equation $$SP = P + \text{Offset}_1 + \text{Offset}_2$$

where SP is the pseudo-location, P is the location data received from the location module 118 of the client device 102, Offset$_1$ is the first random two dimensional offset vector, and Offset$_2$ is the second random two dimensional offset vector.

The determined pseudo-location may be transmitted to the location-based service provider 120 for a location-based service to be provided to the client device 102 (block 410). The data for the pseudo-location may be transmitted by itself or may be included with other data (e.g., with a content item request). In some implementations, the location-based service may be associated with a third-party content item, such as part of the selecting and serving of third-party content items based on the pseudo-location transmitted by the trusted server 130. In other implementations, the location-based service may be associated with a search, such as by presenting a list or other indication of nearby businesses that are relevant to an entered search query and based on the pseudo-location transmitted by the trusted server 130. In yet further implementations, the location-based service may be associated with a social media application, such as associating a location with a post based on the pseudo-location transmitted by the trusted server 130 or associating a location for "checking in" based on the pseudo-location transmitted by the trusted server 130. In some implementations, the trusted server 130 may instead transmit the pseudo-location to the client device 102 for the client device 102 to transmit the pseudo-location to the location-based service provider 120.

Figure 5:
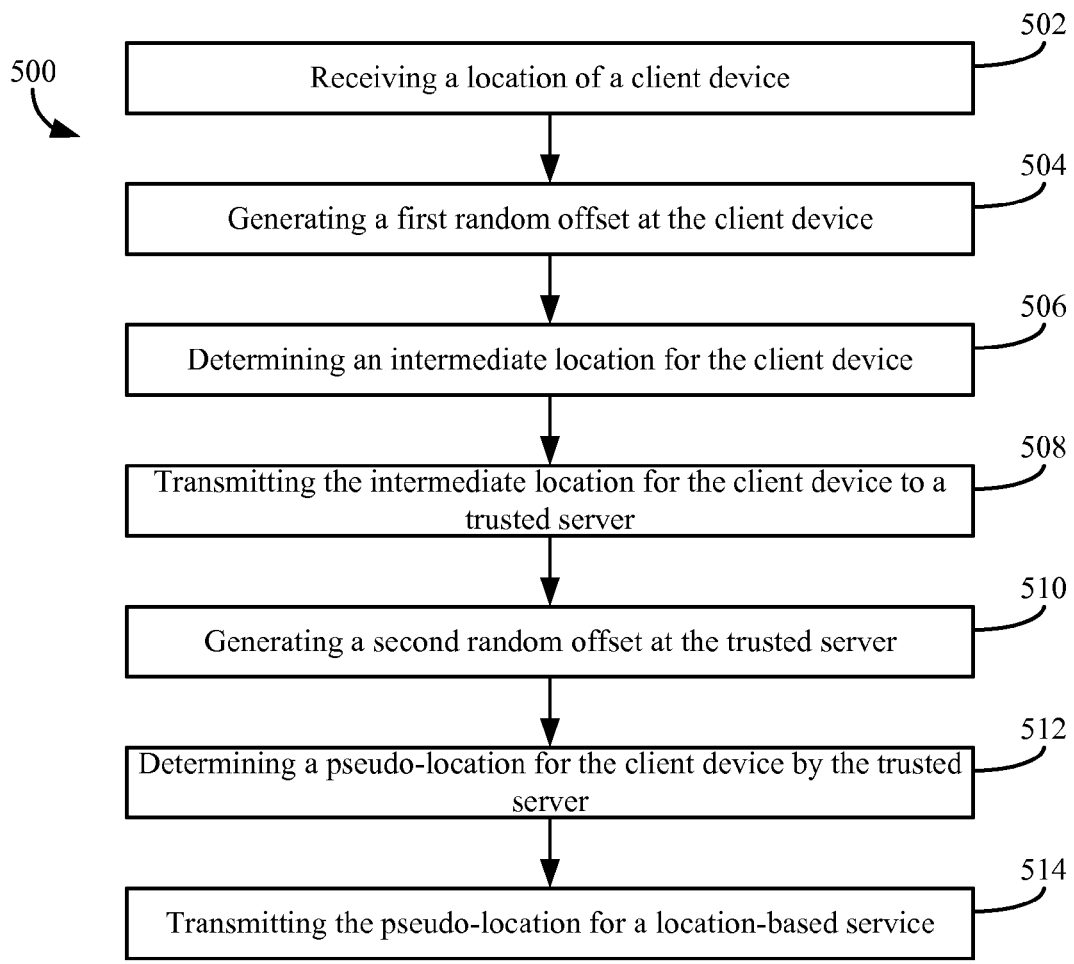
FIG. 5 is yet another flow diagram depicting another example method for obscuring a true location of a client device that may be implemented partially by the client device and partially by the trusted server of FIG. 2.

FIG. 5 depicts another example method 500 that may be implemented partially by the location obscuring module 116 of the client device 102 and partially by the location obscuring module 136 of the trusted server 130. The method 500 may begin when a request for a location is received by the client device 102 (such as from a location-based service provider 120) or the client device 102 is to transmit a location (such as when executing a local application). The method 500 may begin receiving a location of the client device 102 (block 502). In an example implementation, the location obscuring module 116 receives location data from the location module 118. The location data from the location module 118 may include values representative of longitude and latitude coordinates generated by a GPS module, determined from a WiFi access point, determined by cellular triangulation, etc.

The method 500 includes generating a first random offset (block 502). The first random offset may be generated by a random number generator of the location obscuring module 116 of the client device 102. The first random offset may be a two dimensional vector having values corresponding to a randomly generated offset value for an x-axis and a randomly generated offset value for a y-axis. The generation of the first random offset may be substantially similar to that described in reference to block 202 of FIG. 2.

The first random offset may be generated on a periodic basis, such as hourly, daily, weekly, monthly, etc. and stored in a computer-readable medium, such as memory 106. The periodicity for generating the first random offset may be determined such that the movement of the client device 102 over the period is significant compared to a minimum predefined distance. For example, the periodic regeneration of the first random offset may be determined such that the client device 102 is likely to move more than a predetermined distance (e.g., one square kilometer or other distance), which may be based on a user's preferences, local standards, local guidelines, local customs, local laws, etc. In one example implementation, the first random offset may be regenerated on a daily basis.

In other implementations, the first random offset may be generated for each request to be sent to a third-party, such as a location-based service provider 120, for a location-based service. For example, when new location data is to be transmitted from the client device 102 to a location-based service provider 120, the location obscuring module 116 generates a new first random offset.

The location obscuring module 116 may determine, using the processor 104 of the client device 102, an intermediate pseudo-location using the location data from the location module 118 and the generated first random offset (block 506). In one example, the intermediate pseudo-location may be determined by the equation $$ISP = P + \text{Offset}_1$$

where ISP is the intermediate pseudo-location, P is the location data received from the location module 118, and Offset$_1$ is the first random offset.

The determined intermediate pseudo-location may be transmitted to the trusted server 130 (block 508) In some implementations, the data indicative of the intermediate pseudo-location of the client device 102 may include a two dimensional vector of longitude and latitude coordinates corresponding to the intermediate pseudo-location of the client device 102. In other implementations, the data indicative of the intermediate pseudo-location of the client device 102 may be an encoded string of data that may be decoded and parsed into data representative of the intermediate pseudo-location of the client device 102.

The method 500 also includes generating a second random offset (block 510). The second random offset in the present example is generated by the random number generator of the location obscuring module 136 of the trusted server 130. The second random offset may be a two dimensional vector having values corresponding to a randomly generated offset value for an x-axis and a randomly generated offset value for a y-axis. The generation of the second random offset may be substantially similar to that described in reference to block 406 of FIG. 4.

If the first random offset is generated on a periodic basis, then the second random offset may be generated for each request to be sent to a third-party, such as a location-based service provider 120, for a location-based service. For example, when new location data is to be transmitted from the client device 102 to a location-based service provider 120, then the location obscuring module 136 of the trusted server 130 generates a new second random offset.

If the first random offset is generated each time a request is to be sent to a third-party, such as a location-based service provider 120, for a location-based service, then the second random offset may be generated on a periodic basis, such as hourly, daily, weekly, monthly, etc. and stored in a computer-readable medium, such as memory 134. The periodicity for generating the second random offset may be determined such that the movement of the client device 102 over the period is significant compared to a minimum predefined distance. For example, the periodic regeneration of the second random offset may be determined such that the client device 102 is likely to move more than a predetermined distance (e.g., one square kilometer or other distance), which may be based on a user's preferences, local standards, local guidelines, local customs, local laws, etc. In one example implementation, the second random offset may be regenerated on a daily basis. The average length of the first random offset and the second random offset two dimensional vectors may be comparable, e.g., approximately the same distance. In some instances, the first random offset and the second random offset two dimensional vectors may be of a size such that a minimum area to protect privacy is established.

The location obscuring module 136 of the trusted server 130 may determine a pseudo-location using the intermediate pseudo-location data from the client device 102 and the generated second random offset (block 512). In one example, the pseudo-location may be determined by the equation $$SP = ISP + Offset_2$$

where SP is the pseudo-location, ISP is the intermediate pseudo-location data received from the client device 102, and $Offset_2$ is the second random offset.

The determined pseudo-location may be transmitted by the trusted server 130 to the location-based service provider 120 for a location-based service to be provided to the client device 102 (block 514). The data for the pseudo-location may be transmitted by itself or may be included with other data (e.g., with a content item request). In some implementations, the location-based service may be associated with a third-party content item, such as part of the selecting and serving of third-party content items based on the pseudo-location transmitted by the trusted server 130. In other implementations, the location-based service may be associated with a search, such as by presenting a list or other indication of nearby businesses that are relevant to an entered search query and based on the pseudo-location transmitted by the trusted server 130. In yet further implementations, the location-based service may be associated with a social media application, such as associating a location with a post based on the pseudo-location transmitted by the trusted server 130 or associating a location for "checking in" based on the pseudo-location transmitted by the trusted server 130. In some implementations, the trusted server 130 may instead transmit the pseudo-location to the client device 102 for the client device 102 to transmit the pseudo-location to the location-based service provider 120.

Figure 6:
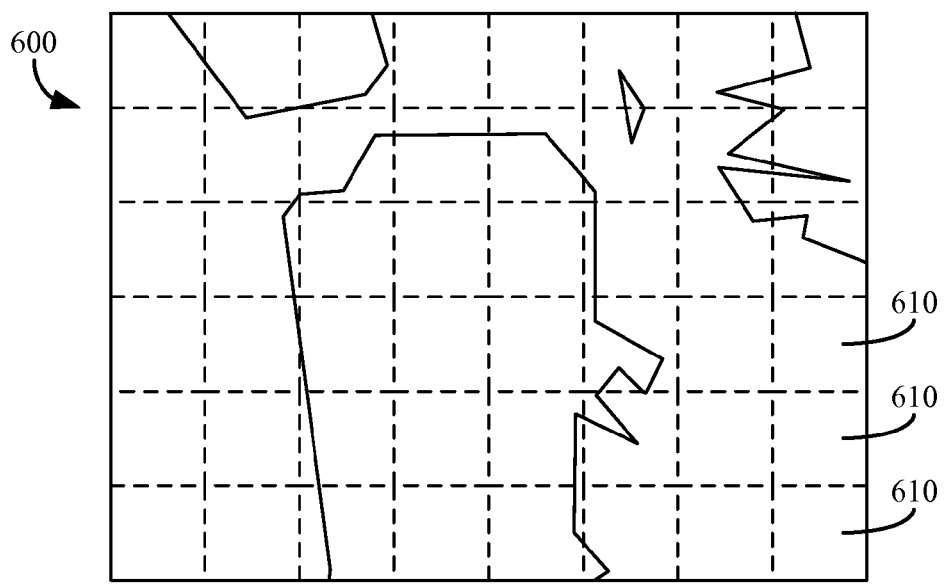
FIG. 6 is an overview depicting an area being divided into a set of regions.

FIG. 6 depicts an overview of an area 600 being divided into a set of regions 610. In the present example, the area 600 may include the entirety of the surface of the Earth or may be a smaller area of the surface of the Earth. The area 600 is divided into a set of regions 610. In some implementations, the regions 610 may correspond to pre-existing subdivisions, such as countries, providences, metro areas, postal codes, etc. In other instances, the regions 610 may be arbitrary subdivisions of the area 600. In another implementation, the area 600 may be subdivided into a set of regions 610 such that each region 610 has an area defined by degrees of longitude and latitude, such as an area of $\frac{1}{100}^{th}$ of a degree of longitude and $\frac{1}{100}^{th}$ of a degree of latitude.

In still other implementations, each region 610 may be determined based on divisions of the substantially spherical Earth. For example, referring to FIG. 7, a sphere 700, representative of the Earth, may be enclosed in a cube 710 with a top surface 712 tangent to the northern-most portion of Earth 702, a bottom surface 714 tangent to the southern-most portion 714 of Earth, and four surfaces (two shown as 716, 718) tangent at the Equator 706. Each point p on the surface of the sphere 700 may be projected onto each surface of the cube 710. That is, drawing a line from the center of the sphere 700, through a point p, to a point on one of the surfaces of the cube 710. Each point p may be represented by the coordinates (face, u, v), where face corresponds to the surface onto which p was projected, u is a first coordinate for the surface, and v is a second coordinate for the surface. Regions 720, 722 may then be defined based on the projections four points $p_1$, $p_2$, $p_3$, and $p_4$ defining an area of the surface of the substantially spherical Earth. In some implementations, the regions 720, 722 may be defined such that each region has the same angular displacement from the adjacent points. That is, if point $p_1$ is at located at the Equator, such as for region 722, then point $p_2$ may be located at a point on the surface of the sphere 700 that is $\frac{1}{100}^{th}$ of a degree of horizontal angular displacement away from point $p_1$, but at the same vertical angular displacement. Similarly, point $p_3$ may be located at a point on the surface of the sphere 700 that is $\frac{1}{100}^{th}$ of a degree of vertical angular displacement away from point $p_1$, but at the same horizontal angular displacement. Point $p_4$ may be located at a point on the surface of the sphere 700 that is both $\frac{1}{100}^{th}$ of a degree of vertical angular displacement and $\frac{1}{100}^{th}$ of a degree of horizontal angular displacement away from point $p_1$. Of course other angular displacements for defining the regions may be used.

The area of each region may be sized such that each region is not significantly smaller than a minimum area to protect privacy and also that each region is not significantly large to render location-based services ineffective.

Figure 7:
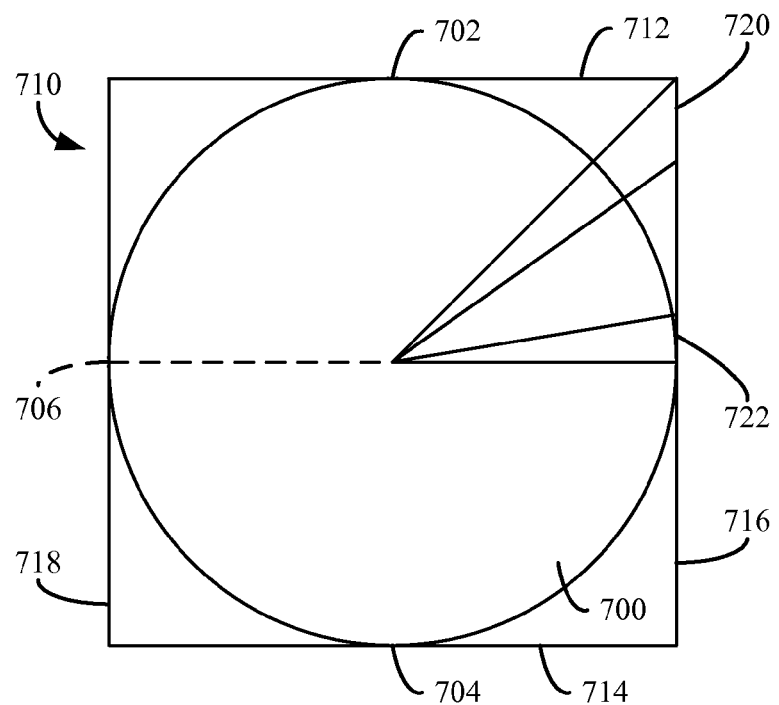
FIG. 7 is a schematic view depicting generating a set of regions based on a division of a sphere.
Figure 8:
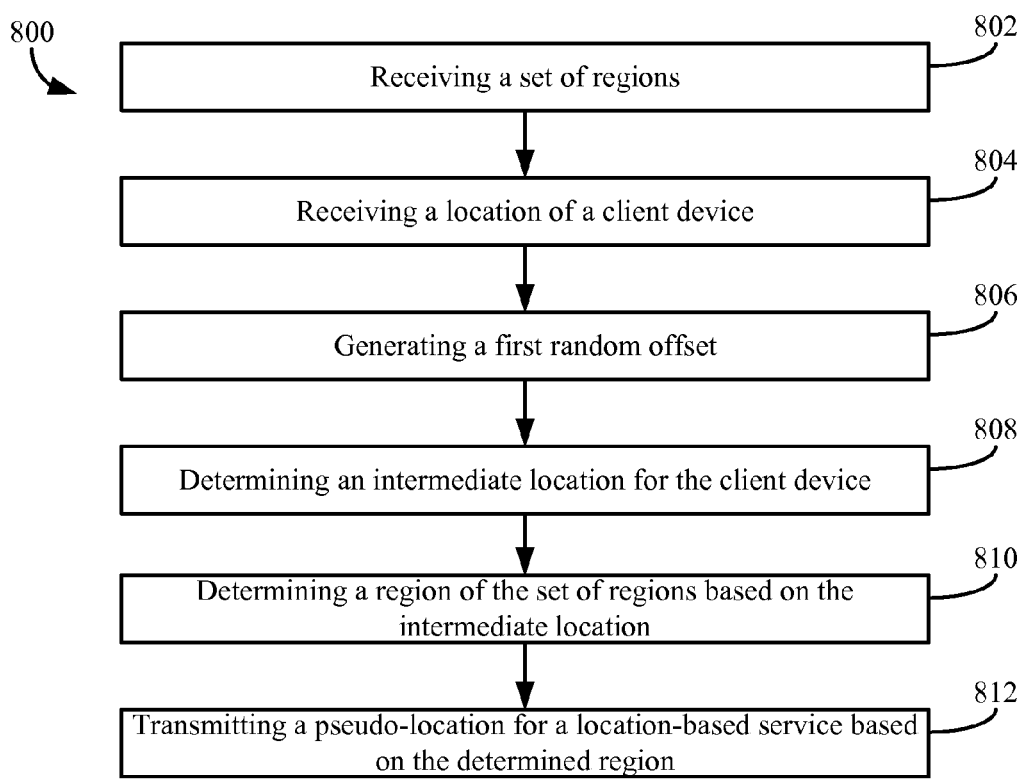
FIG. 8 is a flow diagram depicting an example method for obscuring a true location of a client device using a set of regions.

Referring to FIG. 8, the set of regions, such as regions 610 discussed in reference to FIG. 6 or the regions 720, 722 discussed in reference to FIG. 7, may be used during the obscuring of a true location of a client device 102. FIG. 8 depicts a method 800 that includes receiving a set of regions (block 802). In some implementations, the set of regions may be generated and/or stored by a trusted server 130 or the set of regions may be generated and/or stored by a client device 102. In some implementations, the set of regions may correspond to pre-existing subdivisions of an area, such as countries, providences, metro areas, postal codes, etc. In other implementations, the set of regions may be arbitrary subdivisions of an area. In still other implementations, the set of regions may be defined such that each region has an area defined by degrees of longitude and latitude, such as an area of $\frac{1}{100}^{th}$ of a degree of longitude and $\frac{1}{100}^{th}$ of a degree of latitude. Still further, the set of regions may correspond to regions defined such that each region has the same angular displacement from the adjacent points (e.g., $\frac{1}{100}^{th}$ of a degree of angular displacement). In the present example, the set of regions is received by the trusted server 130, though it should be understood that the method 800 may instead be performed by the client device 102.

Data indicative of a location of the client device 102 is received (block 804). In the present example, the trusted server 130 received the data indicative of a location of the client device 102 that is generated by the location module 118 of the client device 102. In some implementations, the data indicative of the location of the client device 102 may include a two dimensional vector of longitude and latitude coordinates corresponding to the location of the client device 102 as determined by the location module 118 of the client device 102. In other implementations, the data indicative of the location of the client device 102 may be an encoded string of data that may be decoded and parsed into data representative of the location of the client device 102.

The method 800 includes generating a first random offset (block 806). The first random offset in the present example is generated by the random number generator of the location obscuring module 136 of the trusted server 130. The first random offset may be a two dimensional vector having values corresponding to a randomly generated offset value for an x-axis and a randomly generated offset value for a y-axis. The generation of the first random offset may be substantially similar to that described in reference to block 406 of FIG. 4.

In some implementations, the first random offset is generated on a periodic basis for each client device, such as hourly, daily, weekly, monthly, etc. and stored in a computer-readable medium, such as memory 134. The periodicity for generating the first random offset may be determined such that the movement of the client device 102 over the period is significant compared to a minimum predefined distance. For example, the periodic regeneration of the first random offset may be determined such that the client device 102 is likely to move more than a predetermined distance (e.g., one square kilometer or other distance), which may be based on a user's preferences, local standards, local guidelines, local customs, local laws, etc. In one example implementation, the first random offset may be regenerated on a daily basis.

In other implementations, the first random offset is generated for each request to be sent to a third-party, such as a location-based service provider 120, for a location-based service. For example, when new location data is to be transmitted from the client device 102 to a location-based service provider 120, then the location obscuring module 136 of the trusted server 130 generates a new first random offset.

The location obscuring module 136 of the trusted server 130 may determine an intermediate pseudo-location using the location data from the client device 102 and the generated first random offset (block 808). In one example, the intermediate pseudo-location may be determined by the equation $$ISP = P + Offset_1$$

where ISP is the intermediate pseudo-location, P is the location data received from the client device 102, and $Offset_1$ is the first random offset.

Using the intermediate pseudo-location, a region from the set of regions may be determined based on the intermediate pseudo-location (block 810). The determination of the region may be performed by determining which region of the set of regions defines an area in which the intermediate pseudo-location is located. In some implementations, the coordinates of the intermediate pseudo-location may be compared to sets of coordinates defining each region.

Once the region is determined, a pseudo-location based on the determined region may be transmitted by the trusted server 130 to the location-based service provider 120 for a location-based service to be provided to the client device 102 (block 812). The pseudo-location may be associated with the determined region, such as a center point, a corner, or any other fixed point of the region. Thus, if the intermediate pseudo-location is located in the region, the actual location of the client device 102 may be further obscured by using a fixed point associated with the region. The data for the resulting pseudo-location based on the fixed point of the region may be transmitted by itself or may be included with other data (e.g., with a content item request). In some implementations, the location-based service may be associated with a third-party content item, such as part of the selecting and serving of third-party content items based on the pseudo-location transmitted by the trusted server 130. In other implementations, the location-based service may be associated with a search, such as by presenting a list or other indication of nearby businesses that are relevant to an entered search query and based on the pseudo-location transmitted by the trusted server 130. In yet further implementations, the location-based service may be associated with a social media application, such as associating a location with a post based on the pseudo-location transmitted by the trusted server 130 or associating a location for "checking in" based on the pseudo-location transmitted by the trusted server 130. In some implementations, the trusted server 130 may instead transmit the resulting pseudo-location to the client device 102 for the client device 102 to transmit the resulting pseudo-location to the location-based service provider 120.

In some implementations of the method 800 shown in FIG. 8, the intermediate pseudo-location may be determined by the client device 102 and transmitted to the trusted server 130 such that the trusted server 130 only determines the region from the set of regions and may transmit the resulting pseudo-location directly to the location-based service provider 120 or transmit the resulting pseudo-location to the client device 102 to be sent to the location-based service provider 120. In addition, in some implementations, a second random offset may be utilized, similar to that described in reference to FIGS. 2, 4, and/or 5.

Figure 9:
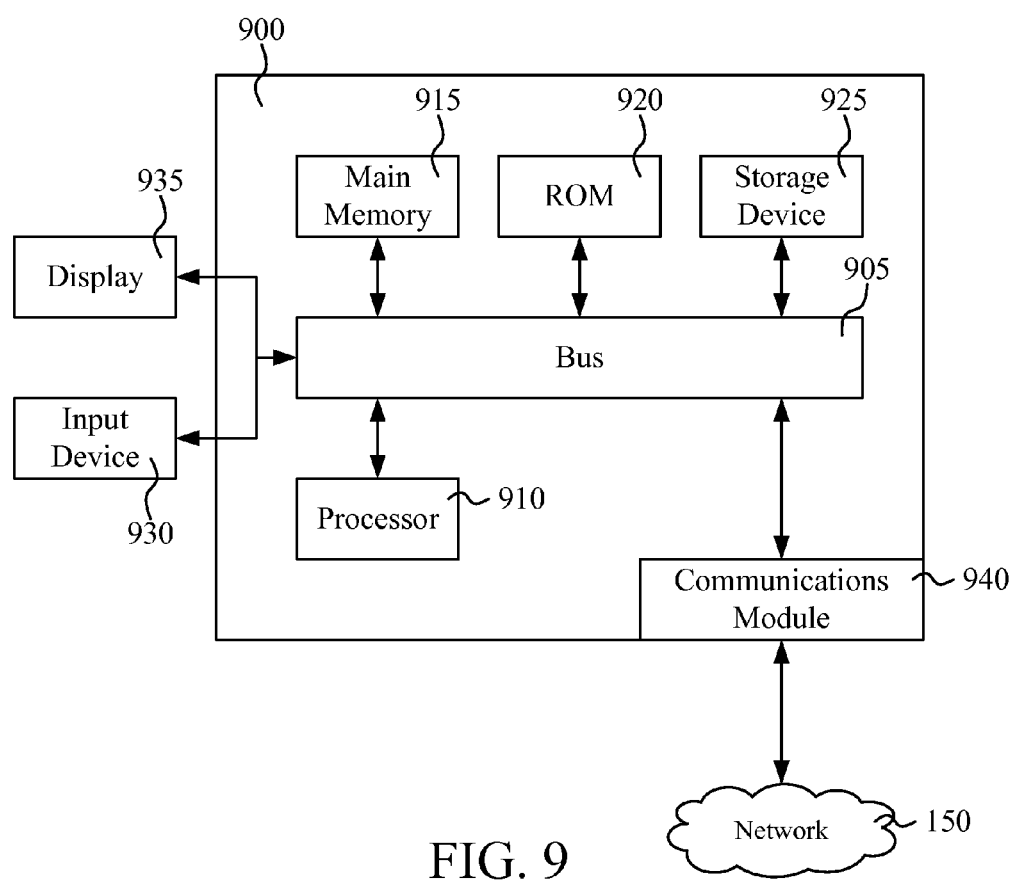
FIG. 9 is a block diagram illustrating a general architecture for a computer system that may be employed to implement various elements of the systems and methods described and illustrated herein.

FIG. 9 is a block diagram of a computer system 900 that can be used to implement the client device 102, the location-based service provider 120, the trusted server 130, and/or any other computing device described herein. The computing system 900 includes a bus 905 or other communication component for communicating information and a processor 910 or processing module coupled to the bus 905 for processing information. The computing system 900 also includes a main memory 915, such as a RAM or other dynamic storage device, coupled to the bus 905 for storing information, and instructions to be executed by the processor 910. The main memory 915 can also be used for storing position information, temporary variables, or other intermediate information during execution of instructions by the processor 910. The computing system 900 may further include a ROM 920 or other static storage device coupled to the bus 905 for storing static information and instructions for the processor 910. A storage device 925, such as a solid state device, magnetic disk or optical disk, is coupled to the bus 905 for persistently storing information and instructions. The computing device 900 may include, but is not limited to, digital computers, such as laptops, desktops, workstations, personal digital assistants, servers, blade servers, mainframes, cellular telephones, smart phones, mobile computing devices (e.g., a notepad, e-reader, etc.), etc.

The computing system 900 may be coupled via the bus 905 to a display 935, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 930, such as a keyboard including alphanumeric and other keys, may be coupled to the bus 905 for communicating information and command selections to the processor 910. In another implementation, the input device 930 may be integrated with the display 935, such as in a touch screen display. The input device 930 can include a cursor control, such as a mouse, a trackball, or cursor direction keys, for communicating direction information and command selections to the processor 910 and for controlling cursor movement on the display 935.

According to various implementations, the processes and/or methods described herein can be implemented by the computing system 900 in response to the processor 910 executing an arrangement of instructions contained in the main memory 915. Such instructions can be read into the main memory 915 from another computer-readable medium, such as the storage device 925. Execution of the arrangement of instructions contained in the main memory 915 causes the computing system 900 to perform the illustrative processes and/or method steps described herein. One or more processors in a multi-processing arrangement may also be employed to execute the instructions contained in the main memory 915. In alternative implementations, hardwired circuitry may be used in place of or in combination with software instructions to effect illustrative implementations. Thus, implementations are not limited to any specific combination of hardware circuitry and software.

The computing system 900 also includes a communications module 940 that may be coupled to the bus 905 for providing a communication link between the system 900 and the network 150. As such, the communications module 940 enables the processor 910 to communicate, wired or wirelessly, with other electronic systems coupled to the network 150. For instance, the communications module 940 may be coupled to an Ethernet line that connects the system 900 to the Internet or another network 150. In other implementations, the communications module 940 may be coupled to an antenna (not shown) and provides functionality to transmit and receive information over a wireless communication interface with the network 150.

In various implementations, the communications module 940 may include one or more transceivers configured to perform data communications in accordance with one or more communications protocols such as, but not limited to, WLAN protocols (e.g., IEEE 802.11 a/b/g/n/ac/ad, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The communications module 940 may include one or more transceivers configured to communicate using different types of protocols, communication ranges, operating power requirements, RF sub-bands, information types (e.g., voice or data), use scenarios, applications, and/or the like. In various implementations, the communications module 940 may comprise one or more transceivers configured to support communication with local devices using any number or combination of communication standards.

In various implementations, the communications module 940 can also exchange voice and data signals with devices using any number or combination of communication standards (e.g., GSM, CDMA, TDNM, WCDMA, OFDM, GPRS, EV-DO, WiFi, WiMAX, S02.xx, UWB, LTE, satellite, etc). The techniques described herein can be used for various wireless communication networks 150 such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Although an example computing system 900 has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a non-transitory tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing module" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular embodiments. Certain features described in this specification in the context of separate embodiments can also be implemented in combination in a single implementation. Conversely, various features described in the context of a single implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method for obscuring a location of a client device comprising:
    receiving, by one or more data processors, an intermediate pseudo-location transmitted from a client device, the intermediate pseudo-location generated based on a true location of the client device and a first randomly generated offset;
    generating, using the one or more data processors, a second randomly generated offset;
    generating, using the one or more data processors, a pseudo-location based on the intermediate pseudo-location and the second randomly generated offset; and
    transmitting the generated pseudo-location to one of the client device or a location-based service.

2. The method of claim 1, wherein the second randomly generated offset is generated for each received intermediate pseudo-location for the client device.

3. The method of claim 2, wherein the second randomly generated offset comprises a two dimensional offset vector.

4. The method of claim 3, wherein the second randomly generated offset comprises a first randomly generated value corresponding to a radius and a second randomly generated value corresponding to an angle.

5. The method of claim 3 further comprising:
    comparing an absolute value of each randomly generated value of the two dimensional offset vector to a predetermined value.

6. The method of claim 1, wherein the first randomly generated offset is generated on a periodic basis for the client device.

7. The method of claim 1, wherein the true location of the client device is determined by one or more of a GPS module, a WiFi access point, or cellular triangulation.

8. A system for obscuring a true location of a client device comprising:
    a processing module; and
    a storage device storing instructions that, when executed by the processing module, cause the processing module to perform operations comprising: generating a first randomly generated offset;

generating an intermediate pseudo-location based on a true location of the client device and the first randomly generated offset;

transmitting the generated intermediate pseudo-location to a server; and receiving from the server a generated pseudo-location based on the intermediate pseudo-location and a second randomly generated offset.

9. The system of claim 8, wherein the first randomly generated offset is generated on a periodic basis for the client device.

10. The system of claim 9, wherein the second randomly generated offset is generated on for each transmission of a generated intermediate pseudo-location to the server.

11. The system of claim 8, wherein the first randomly generated offset is generated offset is generated on for each transmission of a generated intermediate pseudo-location to the server.

12. The system of claim 11, wherein the second randomly generated offset is generated on a periodic basis for the client device.

13. The system of claim 8, wherein the intermediate pseudo-location comprises a two dimensional vector of longitude and latitude coordinates.

14. The system of claim 8, wherein the intermediate pseudo-location comprises an encoded string of data.

15. The system of claim 8, wherein the instructions further cause the processing module to perform operations comprising:

receiving a request for a location from a location-based service; and transmitting the received generated pseudo-location to the location-based service responsive to the received request.

16. The system of claim 15, wherein transmitting the received generated pseudo-location comprises a content item request with the generated pseudo-location.

17. A system for obscuring a true location of a client device comprising:

a processing module; and a storage device storing instructions that, when executed by the processing module, cause the processing module to perform operations comprising:

receiving an intermediate pseudo-location transmitted from a client device, the intermediate pseudo-location generated based on a true location of the client device and a first randomly generated offset generated on a periodic basis for the client device;

generating a second randomly generated offset responsive to receive the intermediate pseudo-location;

generating a pseudo-location based on the intermediate pseudo-location and the second randomly generated offset; and transmitting the generated pseudo-location to one of the client device or a location-based service.

18. The system of claim 17, wherein the true location of the client device is determined based on GPS data.

19. The system of claim 17, wherein the true location of the client device is determined based on data from a WiFi access point.

20. The system of claim 17, wherein the true location of the client device is determined based on signal strength from one or more cellular towers.

* * * * *